(12) United States Patent
Hanna et al.

(10) Patent No.: US 9,132,916 B2
(45) Date of Patent: Sep. 15, 2015

(54) AIRCRAFT DEPLOYMENT AND RETRIEVAL OF UNMANNED AERIAL VEHICLES

(71) Applicant: The Boeing Company, Chicago, IL (US)

(72) Inventors: Mark Hanna, Medford, NJ (US); David R. Poling, West Chester, PA (US)

(73) Assignee: The Boeing Company, Chicago, IL (US)

( * ) Notice: Subject to any disclaimer, the term of this patent is extended or adjusted under 35 U.S.C. 154(b) by 305 days.

(21) Appl. No.: 13/664,323

(22) Filed: Oct. 30, 2012

(65) Prior Publication Data

US 2014/0117147 A1    May 1, 2014

(51) Int. Cl.
*B64C 39/02*    (2006.01)

(52) U.S. Cl.
CPC ......... *B64C 39/024* (2013.01); *B64C 2201/082* (2013.01); *B64C 2201/126* (2013.01); *B64C 2201/182* (2013.01); *B64C 2201/206* (2013.01)

(58) Field of Classification Search
CPC   B64C 39/024; B64C 2201/027; B64C 27/04; B64C 2201/042; B64C 2201/108; B64C 2201/126; B64C 2201/182; B64C 2201/206
USPC ........ 244/1 TD, 2, 17.11, 17.23, 137.1, 137.4
See application file for complete search history.

(56) References Cited

U.S. PATENT DOCUMENTS

| | | |
|---|---|---|
| 965,881 A | 8/1910 | Draper |
| 968,339 A | 8/1910 | Geraldson |
| 1,144,505 A | 6/1915 | Steffan |
| 1,383,595 A | 7/1921 | Black |
| 1,499,472 A | 7/1924 | Pratt |
| 1,624,188 A | 4/1927 | Simon |
| 1,686,298 A | 10/1928 | Uhl |
| 1,716,670 A | 6/1929 | Sperry |
| 1,737,483 A | 11/1929 | Verret |
| 1,738,261 A | 12/1929 | Perkins |
| 1,748,663 A | 2/1930 | Tucker |
| 1,836,010 A | 12/1931 | Audrain |
| 1,842,432 A | 1/1932 | Stanton |
| 1,869,506 A | 8/1932 | Richardson |
| 1,912,723 A | 6/1933 | Perkins |
| 2,364,527 A | 12/1944 | Haygood |
| 2,365,827 A | 12/1944 | Liebert |
| 2,488,050 A * | 11/1949 | Brodie ........................ 244/110 F |
| 4,267,987 A * | 5/1981 | McDonnell ........................ 244/2 |
| 4,523,729 A | 6/1985 | Frick |
| 5,836,548 A * | 11/1998 | Dietz et al. .................. 244/137.1 |
| 5,906,336 A | 5/1999 | Eckstein |
| 7,059,564 B2 | 6/2006 | Dennis |

(Continued)

*Primary Examiner* — Valentina Xavier
(74) *Attorney, Agent, or Firm* — Felix L. Fischer

(57) ABSTRACT

An aircraft system incorporates a first aircraft having a grappling device including a first gripper with a first actuator and a second gripper with a second actuator. The first gripper and the second gripper are movable between an open and a closed position to engage a hooking device and pivot together to change a capture angle. A first controller receives a command and operates the actuators in response to open and close the first and second grippers of the grappling device. The controller also receives a second command and operates the first and second actuators to pivot the grippers and provide grappling at a range of capture angles. A second aircraft, which may be a UAV, incorporates the hooking device. The hooking device includes a ring rotatable from the surface and a third actuator to rotate the ring between a stowed and an extended position.

13 Claims, 13 Drawing Sheets

(56) References Cited

U.S. PATENT DOCUMENTS

| | | |
|---|---|---|
| 7,066,430 B2 | 6/2006 | Dennis et al. |
| 7,090,166 B2 | 8/2006 | Dennis et al. |
| 7,121,507 B2 | 10/2006 | Dennis et al. |
| 7,152,827 B2 | 12/2006 | McGeer |
| 7,175,135 B2 | 2/2007 | Dennis et al. |
| 7,806,366 B2 | 10/2010 | Jackson |
| 7,900,866 B2 | 3/2011 | Kutzmann et al. |
| 7,980,798 B1 * | 7/2011 | Kuehn et al. ................ 410/104 |
| 8,038,090 B2 | 10/2011 | Wilson et al. |
| 8,590,828 B2 * | 11/2013 | Marcus ..................... 244/17.23 |
| 2006/0202088 A1 * | 9/2006 | Padan ....................... 244/137.1 |
| 2007/0262197 A1 * | 11/2007 | Phelps et al. ............. 244/17.11 |
| 2012/0174344 A1 * | 7/2012 | Niklas et al. ............. 24/265 CD |
| 2014/0183300 A1 * | 7/2014 | MacCulloch et al. ...... 244/1 TD |

* cited by examiner

AIRCRAFT DEPLOYMENT AND RETRIEVAL OF UNMANNED AERIAL VEHICLES

BACKGROUND

1. Field

Embodiments of the disclosure relate generally to the field of unmanned aerial vehicle (UAV) deployment and retrieval and more specifically to use of airborne deployment and retrieval of low value UAVs from a multiple unit magazine with advanced grappling capability.

2. Background

Unmanned aerial vehicles (UAVs) are being utilized as assets in many surveillance and combat activities. Presently, most UAV missions with complex requirements are satisfied using high value UAVs. Due to limited availability of these assets, mission planners need to coordinate the various assets to insure a UAV with sufficient capabilities is available, at the specific time and location of the intended mission. Should the mission change or get delayed, UAV mission support may be missing or limited. Due to limited range and performance, low value UAVs require ground support to be able to launch the UAV close to the mission location. Not only does this proximity to the mission location put ground forces at risk, it also precludes the ability to dynamically change mission locations and objectives due the logistical effort of relocating specific UAV assets close to an alternate launch location.

It is therefore desirable to provide a solution that addresses these and other problems.

SUMMARY

In view of the limitations of prior solutions, it is therefore desirable to provide a UAV deployment and retrieval system which may be employed by rotorcraft or fixed wing aircraft to allow use of low value UAVs in satisfying enhanced mission requirements. Embodiments disclosed herein provide an aircraft system incorporating a first aircraft having a grappling device including a first gripper operatively attached to a first actuator and a second gripper operatively attached to a second actuator independent from the first actuator. The first gripper and the second gripper are operatively attached and configured to move between an open and a closed position to engage a hooking device and further configured to pivot together to change a capture angle. A first controller is configured to receive a command and operates the first and second actuators in response to the command to selectively open and close the first and second grippers of the grappling device. The controller is also configured to receive a second command and operates the first and second actuators to pivot the grippers and provide grappling at a range of capture angles.

A UAV deployment and retrieval system employs an aircraft having a grappling device, a carousel adapted to receive and store multiple UAVs and positionable for deployment of a selected UAV. Each UAV has a hooking device adapted for engagement by the grappling device. A mission controller receives a mission requirement and selects a respective one of the UAVs. A carousel controller responsive to the mission controller aligns the respective one UAV for deployment and a grappling device controller responsive to the mission controller retrieves the UAV with the grappling device.

A method of deploying a selected UAV is provided by the UAV deployment and retrieval system. The system receives a command to deploy a UAV having a particular capability. A UAV is selected from multiple UAVs having the particular capability. The selected UAV is then deployed.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide the ability to deploy and retrieve UAVs from rotorcraft (i.e. rotary wing aircraft or fixed wing aircraft with a unique grappling methodology and use of a multiple UAV magazine for mission specific UAV selection. A navigation and control system for automating selection, deployment and retrieval of UAVs by a single aircraft or cooperatively with other assets enhances system operability.

Figure 1A:
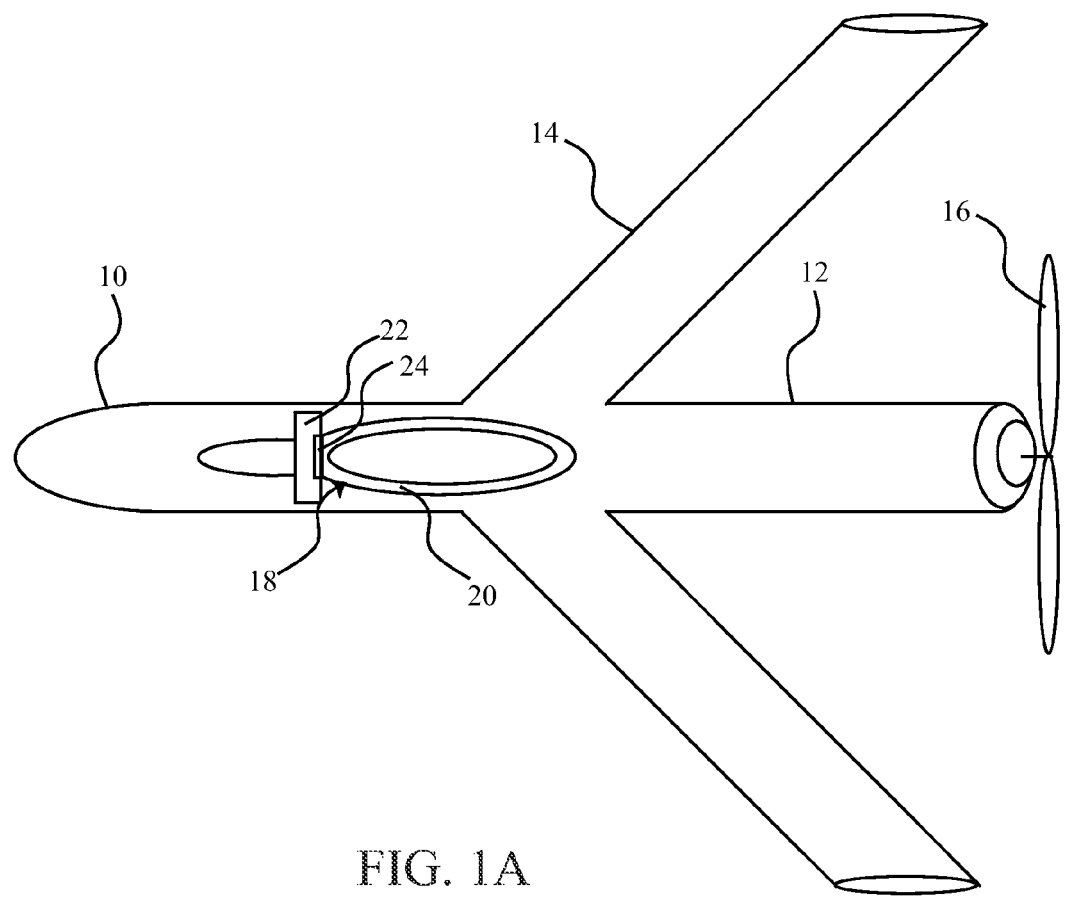
FIGS. 1A is a top view of an example UAV with a hooking device in a retracted position.
Figure 1B:
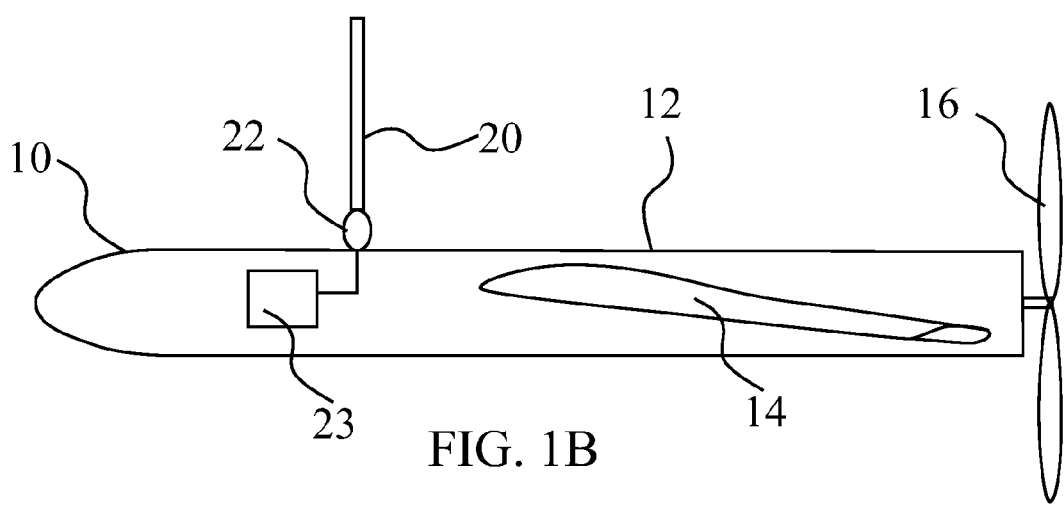
FIG. 1B is a side view of the UAV of FIG. 1A showing the hooking device extended in a deployed position.

An example UAV 10 is shown in FIGS. 1A and 1B. The UAV incorporates a fuselage 12 and wings 14, which for certain applications may be retractable or stowable for reduced storage profile. A propulsion system such as a motorized propeller 16 or possibly small jet engine provides thrust for operation. A hooking device 18 is employed to retrieve and deploy the UAV from a rotorcraft or aircraft as will be described in greater detail subsequently. A ring 20 in the hooking device 18 may be fixed or deployable for aerodynamic considerations when the UAV is in free flight. For a deployable system, an actuator 22 is attached to the ring 20 for rotation of the ring from a first position, flush with the UAV fuselage, to a second position, extended from the fuselage as shown in FIG. 1B for engagement by a grappling system to be described in greater detail subsequently. Actuator 22 is activated by a controller 23 and may be positioned in multiple positions including the stowed position, extended position for capture and a post capture position, for example for aligning the UAV for storage or release. Grappling sensors 24 such as contact or strain sensors may be employed in the hooking device for detection of engagement by the grappling system.

Figure 2A:
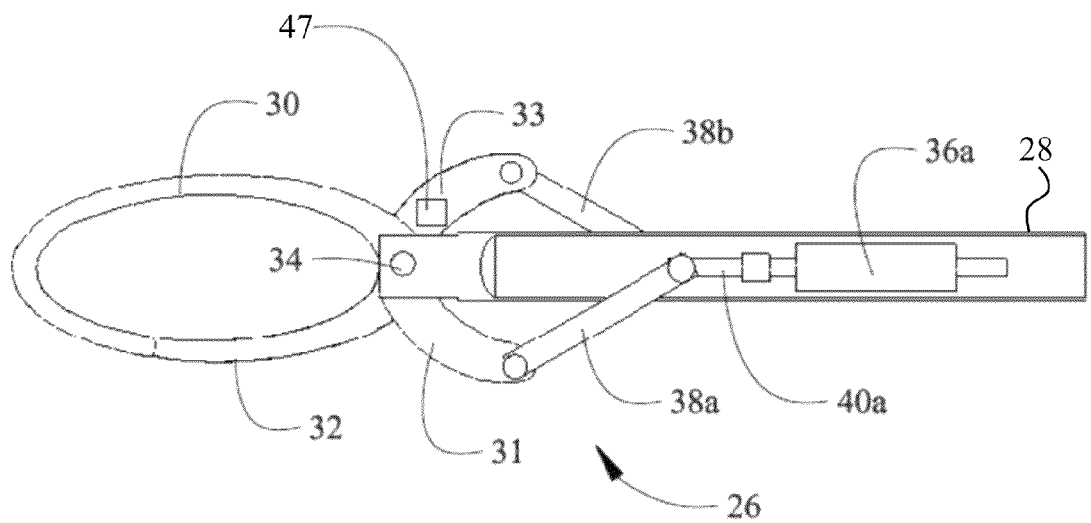
FIG. 2A is a side view of the grappling device in the closed position.
Figure 2B:
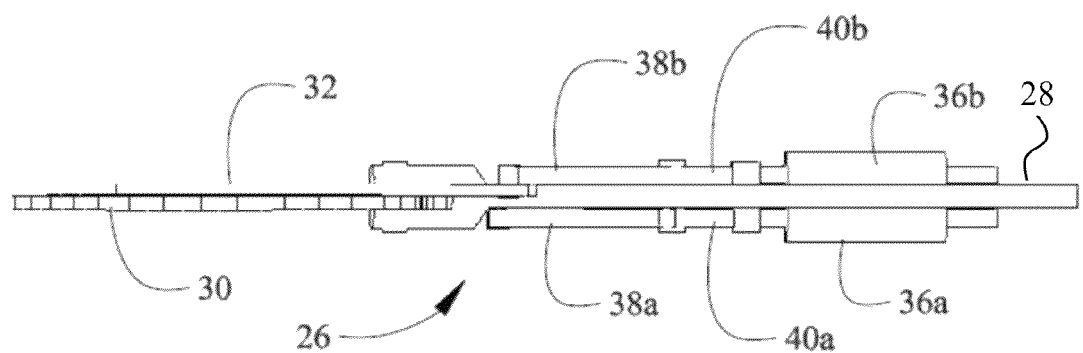
FIG. 2B is a top view of the grappling device.
Figure 2C:
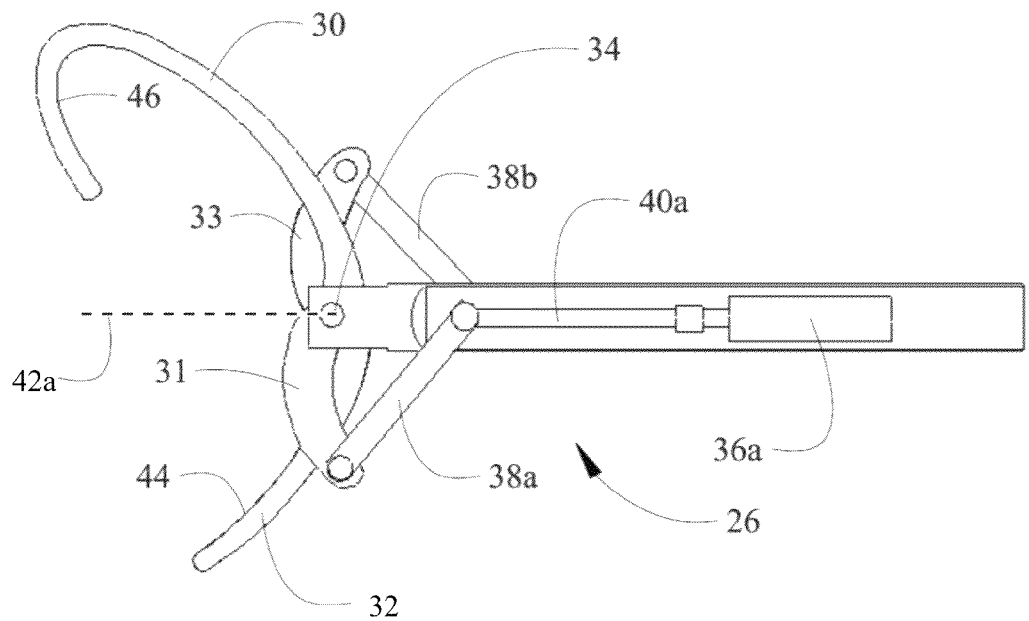
FIG. 2C is a side view of the grappling device in the open position at a first capture angle.
Figure 2D:
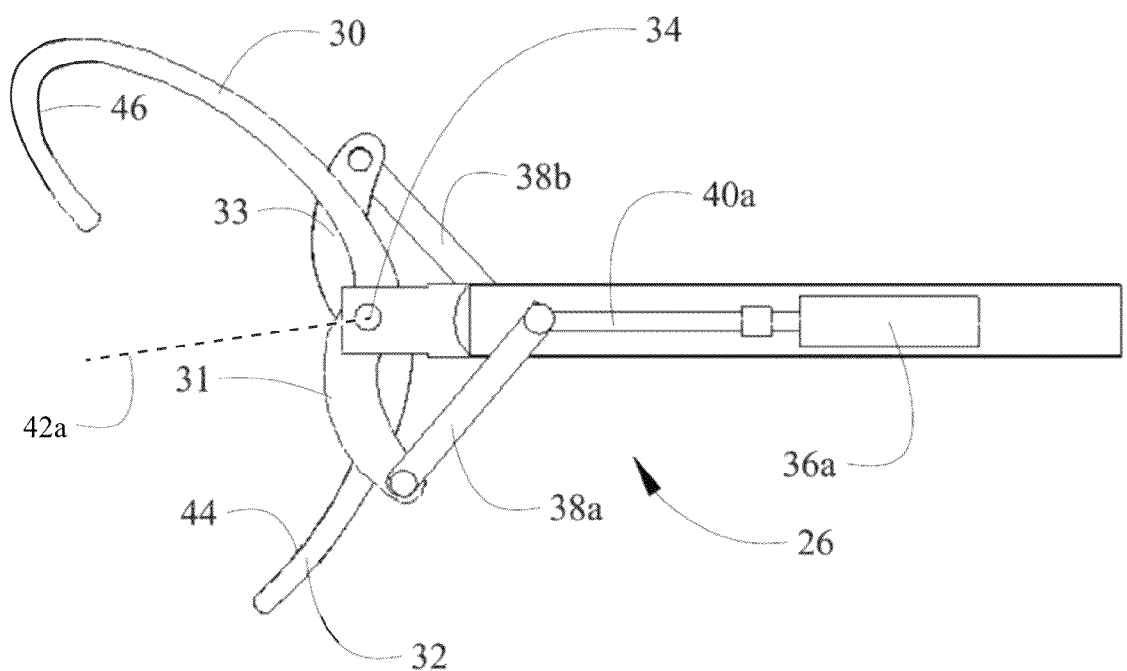
FIG. 2D is a side view of the grappling device in an open position at a second capture angle.

A grappling device 26 is shown in FIGS. 2A-2D. A support rod 28 provides mounting support for an upper gripper 30 and a lower gripper 32 which are attached at a pivot 34 on the support rod. A first actuator 36a manipulates the upper gripper 30 through a link pin 38a attached to a drive rod 40a. For the embodiment show a linear actuator is employed however rotary actuators may be employed in alternative embodiments. The link pin 38a is attached to a scissor tail 31 extending opposite the upper gripper from pivot 34. Similarly, a second actuator 36b manipulates the lower gripper 32 through a link pin 38b attached to a drive rod 40b. The link pin 38b is attached to a scissor tail 33 extending opposite the lower gripper from pivot 34. Extension of the first and second actuator drive rods 40a and 40b opens the upper and lower grippers 30 and 32 from a closed or grasping position shown in FIG. 2A to an open position as shown in FIG. 2C. With asymmetric extension of the drive rods, a rotational position of the upper and lower gripper as represented by axis 42a in FIG. 2B and 42b in FIG. 2D can be adjusted for enhanced engagement or disengagement of the UAV hooking device 18.

The upper and lower grippers are configured in an asymmetric fashion. The lower gripper 32 provides a smooth surface with a non-binding engagement profile 44 enhancing the capture and release of the UAV hooking device. The upper gripper 30 incorporates a surface with a closed profile 46 with a hook to insure a positive retention of the UAV hooking device 18 with the grippers in the closed position. Two grappling devices 26 may be used in parallel to enhance the stability of the UAV prior to release or upon capture and aid in its retraction and storage in the aircraft. A grab line or capture net may be used instead of the grappling device for UAV not equipped with a hooking device 18. The grappling device 26 may have one or more integral contact sensors 47 to detect the contact with the UAV Hooking device. An output signal, denoted a hooking sensor signal, from the sensors 47 may be used to operate the closures of the grappling device 26. In this case, the contact or strain sensors produce a contact signal indicating contact with the grippers of the grappling device.

Figure 3:
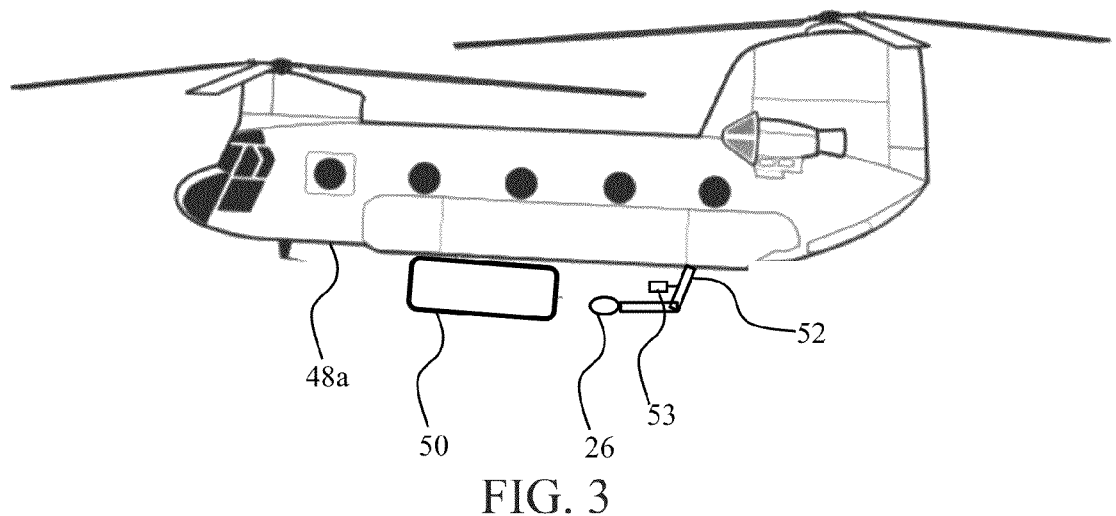
FIG. 3 is a side view of a helicopter employing the grappling device and mounting a UAV magazine for selective launch and recovery of UAVs.
Figure 4:
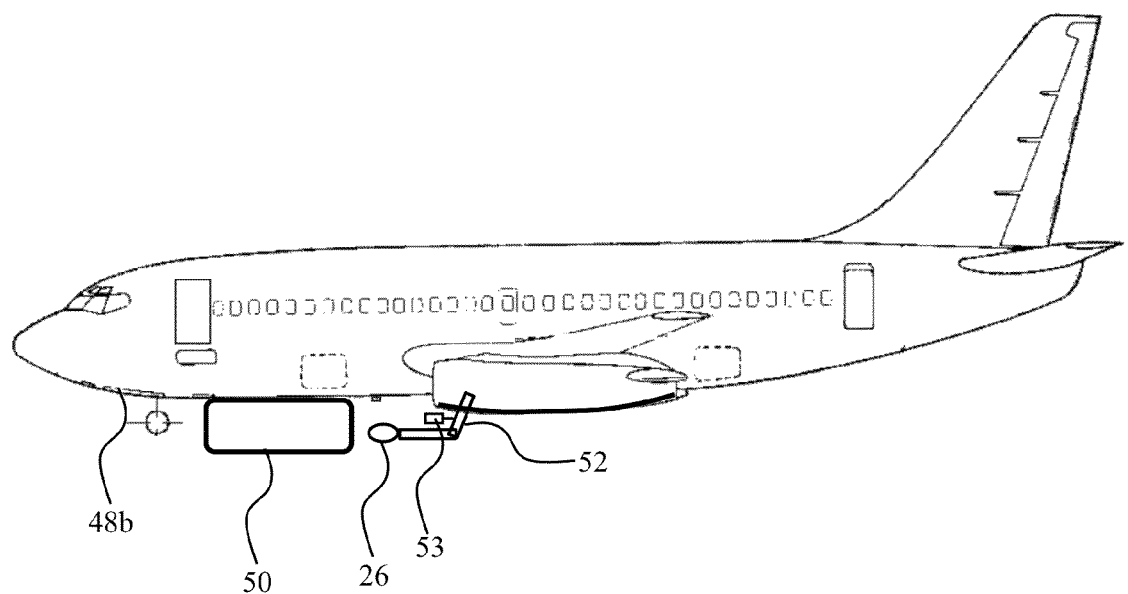
FIG. 4 is a side view of a fixed wing aircraft employing the UAV magazine.

Deployment and retrieval of UAV 10 is accomplished in certain operational scenarios with a rotorcraft 48a as shown in FIG. 3 or a fixed wing aircraft 48b as shown in FIG. 4. A storage and manipulation magazine 50 is attached to the rotorcraft or aircraft to contain the UAVs as will be described in greater detail subsequently. In certain embodiments, the magazine may be retractable into the rotorcraft or aircraft. Grappling device 26 is extendible from the rotorcraft or aircraft with a manipulating arm 52 which may be telescoping and rotatable for positioning of the grappling device 26 for removal or insertion of UAVs from the magazine 50 and for release or capture of the UAVs in flight. A UAV location sensor 53 such as a radar, lidar or infrared (IR) device may be located adjacent the grappling device for sensing of the location/proximity of the UAV during grappling operations. A complimentary or alternative sensor on the UAV may also be employed with communication to the grappling control system as will be described in greater detail subsequently.

Figure 5:
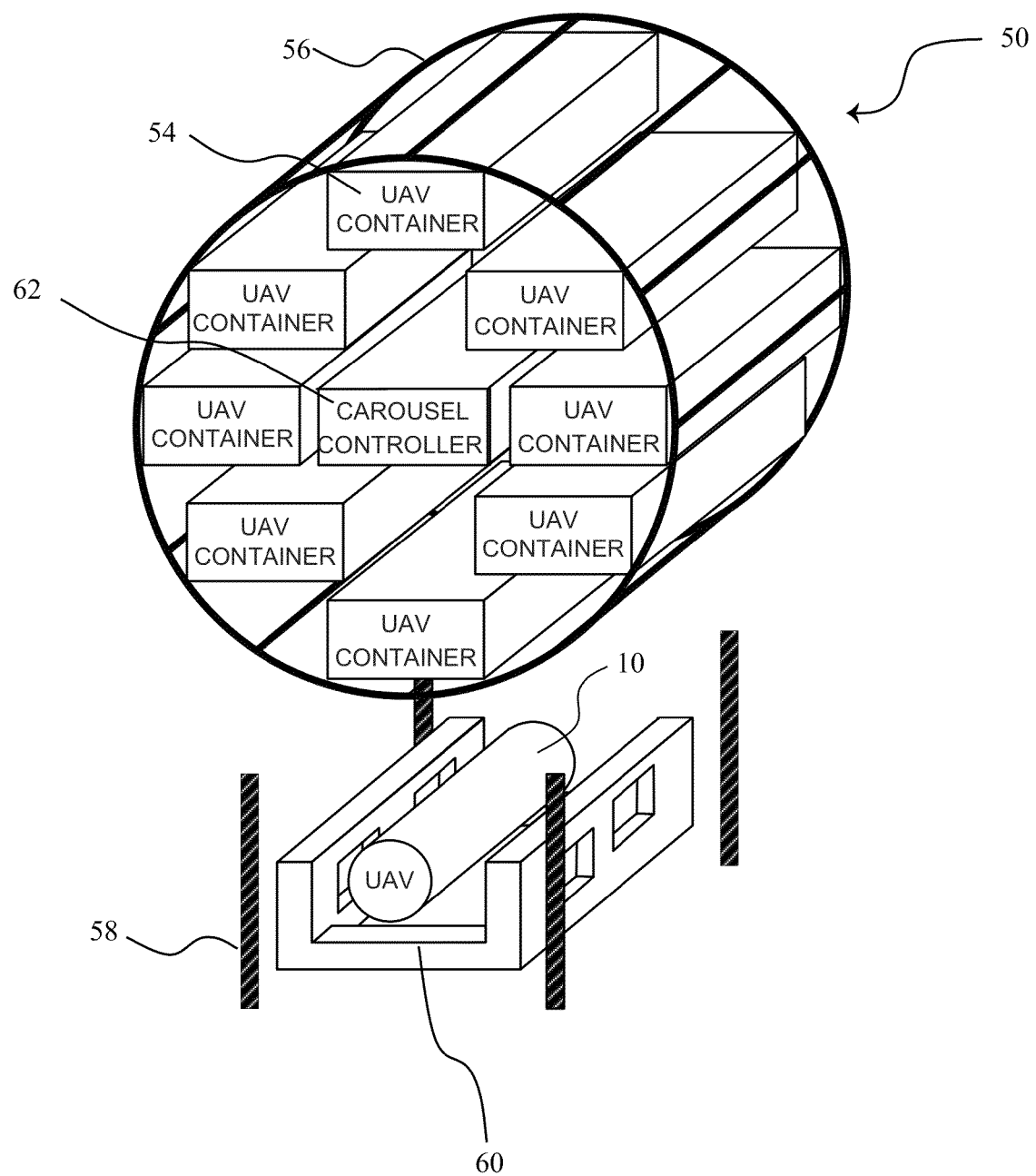
FIG. 5 is a perspective block diagram representation of the magazine.

An example magazine 50 is shown in FIG. 5. Multiple UAV containers 54 are supported within a rotatable carrousel 56. Receiver actuation rails 58 extendible from the carrousel 56 support a deployment and retrieval cradle 60, which in certain embodiments may be the UAV container, that is extended on the rails below the carrousel. Grappling device 26 may then be employed to remove the UAV from the cradle 60 for release or to insert a retrieved UAV into the cradle. As represented in FIG. 5, the UAV 10 will typically have retractable wings as previously described for compact storage in the container and carrousel.

The individual UAVs provided in the containers 54 in the carousel 56 may be of different types or with varying capabilities with respect to sensor packages or other operational characteristics. Control logic 62 in the carrousel 56 communicating with a mission control system, to be described subsequently, is employed to select the appropriate UAV for a desired mission profile and aligning the carrousel for deployment of the container/UAV on the cradle 60.

Figure 6A:
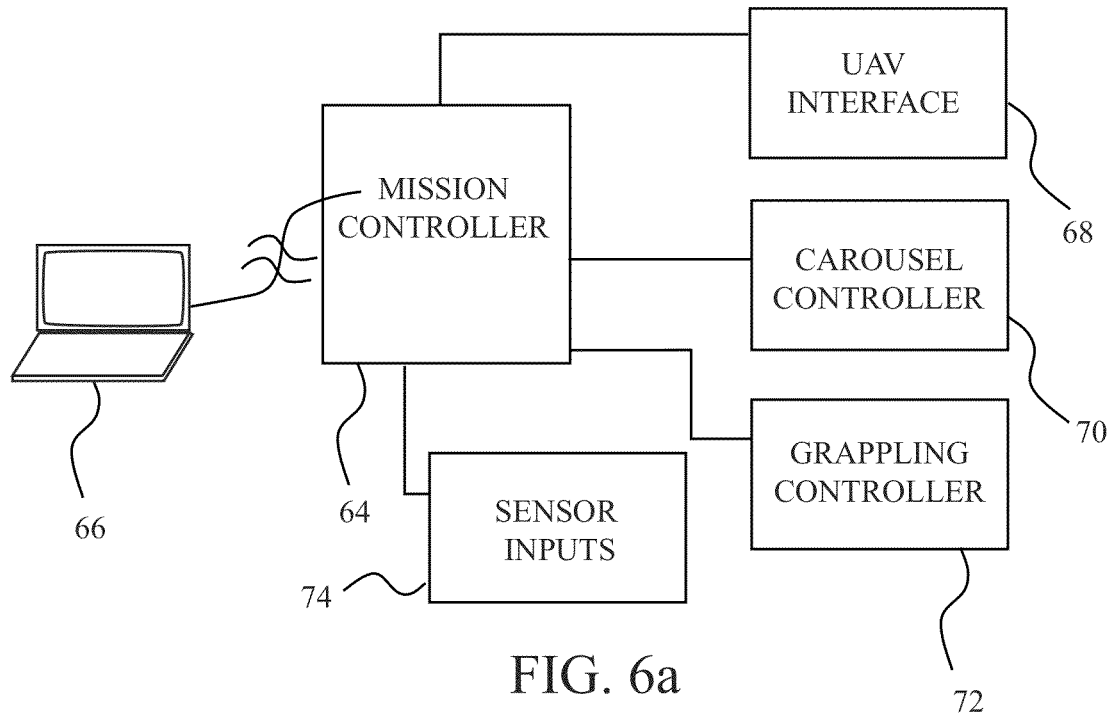
FIG. 6A is a block diagram of a user interface and mission controller for operation with the UAV interface, carousel controller and grappling device controller.

As shown in FIG. 6A, a central mission controller 64 provides communication and control of the UAVs on board the aircraft in the carrousel and as deployed or retrieved. The mission controller 64 may be located on the rotorcraft/aircraft or remotely with appropriate telemetry. A standard user interface 66 may be collocated with the mission controller or remote to the mission controller with appropriate telemetry. The mission controller 64 communicates with the UAVs through a UAV interface 68. UAVs within the containers in the carousel may have wireless or wired communications to the UAV interface. Control of the carrousel for selection or restacking of UAVs is accomplished by the mission controller through a carrousel controller 70. The mission controller 64 additionally provides control to the grappling system through a grappling controller 72 using sensor inputs 74 connected to the grappling sensors 24, contact sensors 46 and location sensor 53. The grappling controller 72 commands actuators 36a and 36b for opening, closing and angled articulation in capture and release of the UAV.

Figure 6B:
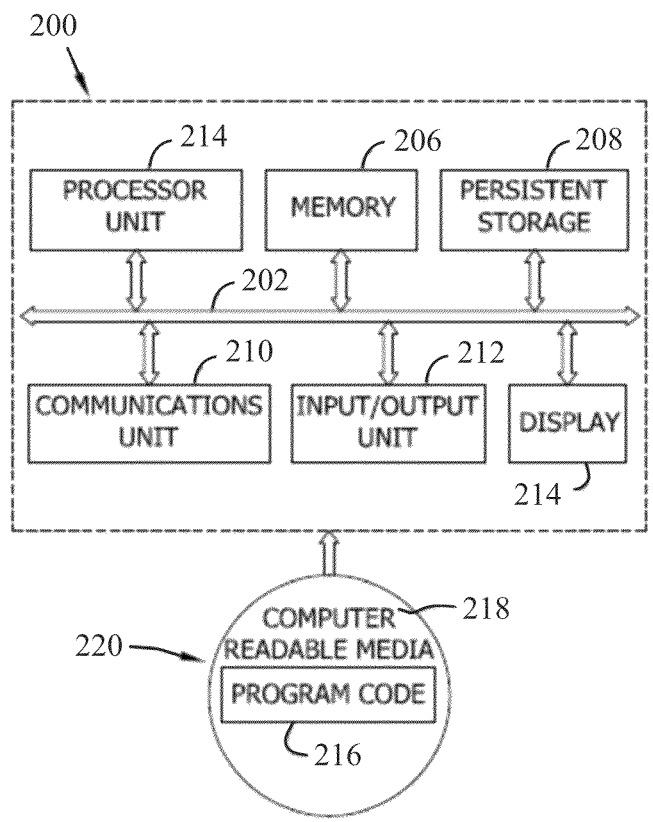
FIG. 6B is a block diagram of an exemplary computer system for implementation of the mission controller.

The mission controller 64 may be a general purpose or mission specific computer architecture having the general structure as defined in FIG. 6B. An exemplary data processing system 200 may be used in implementing the embodiments described herein. In the exemplary embodiment, data processing system 200 includes communications fabric 202 providing communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. In one example, processor unit 204 is implemented using one or more heterogeneous processor systems including a main processor and one or more secondary processors on a single chip.

Processor unit 204 may be a multi-processor system containing multiple, same type processors. Processor unit 204 may be implemented using one or more programmable circuits including one or more systems and microcontrollers, programmable logic circuits, field programmable gate arrays (FPGA), microprocessors, application specific integrated circuits (ASIC), and other like circuits capable of executing the functions described herein.

Memory 206 and persistent storage 208 are examples of storage devices capable of storing information either on a temporary basis and/or a permanent basis. In another example, memory 206, may be a random access memory or any other volatile or non-volatile storage device or the like. Persistent storage 208 may take various forms depending on the particular implementation. In one instance, persistent storage 208 may be a fixed or removable hard drive, a flash memory, a rewritable optical disk, a rewritable magnetic tape, or some combination of the above. In one example, a removable hard drive may be used for persistent storage 208.

Input/output unit 212 provides input and output of data with one or more other devices that may be connected to data processing system 200. Input/output unit 212 may provide, for example, without limitation, a connection for user input through a keyboard and mouse. Input and/or output unit 212 may send output to a printer. Display 214 provides a mechanism to display information to a user.

Communications unit 210, in these examples, provides for communications with other data processing systems or devices. In these examples, communications unit 210 is a network interface card. Communications unit 210 may provide communications through the use of either or both physical and wireless communication links. Instructions for the operating system and applications or programs are located on persistent storage 208. Instructions may be loaded into memory 206 for execution by processor unit 204. Processes of various embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 to perform the various activities as will be described subsequently is located in a functional form on computer readable media 218 that is selectively removable and may be loaded onto or transferred to data processing system 200 for execution by processor unit 204. Program code 216 and computer readable media 218 form computer program product 220 in these examples. Computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. Computer readable media 218 may take the form of a tangible form including persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 1000 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 6B can be varied from the illustrative examples shown.

In one variant, a storage device in data processing system 200 may be any hardware apparatus that may store data. Memory 206, persistent storage 208 and computer readable media 218 are examples of storage devices in a tangible form. In another example, a bus system may be used to implement communications fabric 202 and may be comprised of one or more buses, such as a system bus or an input/output bus. In another variant, the bus system may be implemented using any type of architecture that provides for a transfer of data between components or devices attached to the bus system. Additionally, a communications unit may include one or more devices used to transmit and receive data, such as a modem or a network adapter. For example and without limitation, memory 206 or a cache such as that found in an interface and memory controller hub that may be present in communications fabric 202.

Figure 7:
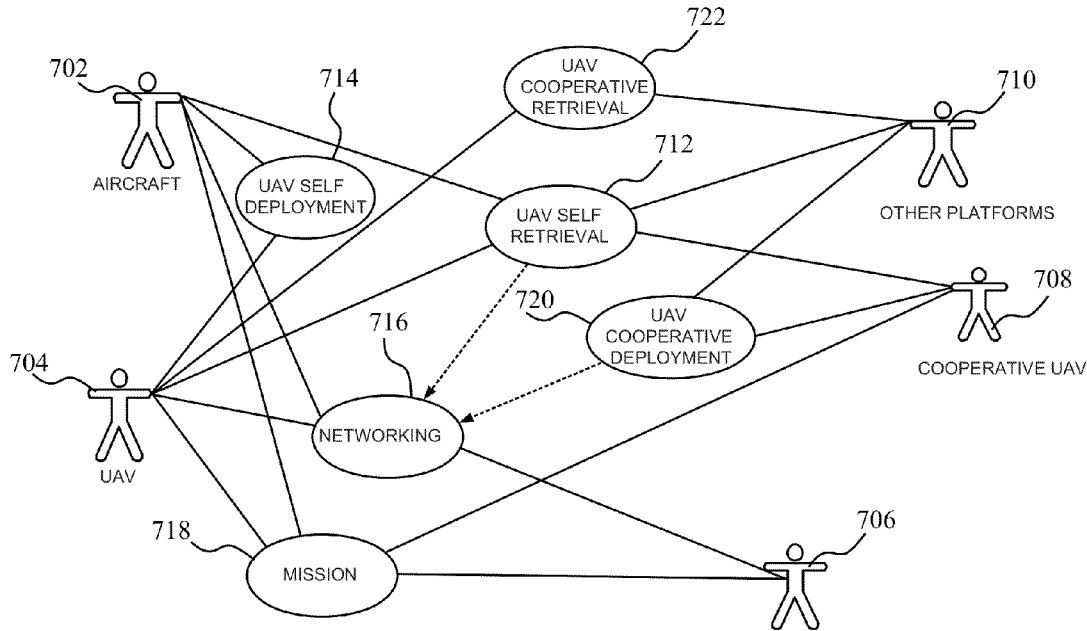
FIG. 7 is a state diagram showing actors and states for UAV deployment and retrieval with embodiments as disclosed.

FIG. 7 describes the generalized activities preformed as control routines by the mission controller 64 associated with UAV deployment and retrieval with the mission controller receiving input and providing data output to the various actors. An Aircraft Actor 702 represents the aircraft (e.g. rotorcraft) 48a performing the mission. As previously described the mission controller may be located aboard the aircraft or remotely with network communications to the aircraft. The Aircraft Actor 702 is typically responsible for the self deployment and retrieval of the UAV and is associated with the activities of UAV Self Retrieval 712, UAV Self Deployment 714, Networking 716, Mission 718, UAV Cooperative Deployment 720, and UAV Cooperative Retrieval 722.

A UAV Actor 704 represents the generalized family of UAV that the Aircraft Actor can call upon to perform the defined mission (e.g. the UAVs present in the carousel 50 and/or cooperative UAVs to be described subsequently. The UAV Actor is associated with the activities of UAV Self Deployment 714, UAV Self Retrieval 712, Networking 716 and Mission 718.

An Operating Environment Actor 706 represents the natural operating conditions (e.g., wind, temperature, altitude, ice, rain, etc.) for the Aircraft and UAV Actors. The Operating Environment Actor 706 is associated with the activities of Mission 718 and Networking 716.

A Cooperative UAV Actor 708 represents an UAV that was launched by some second or third party which the Aircraft Actor 702 will be retrieving. The Cooperative UAV Actor is associated with the activities of Mission 718, UAV Cooperative Deployment 720 and UAV Self Retrieval 712.

An Other Platform Actor 710 represents some second or third party receiver (either ground or airborne based) that will act as an alternative platform to retrieve a UAV deployed by the Aircraft Actor 702 in the event that the Aircraft Actor cannot perform the retrieval. The Other Platform Actor 710 is associated with the activities of UAV Cooperative Retrieval 722, UAV Self Retrieval 712 and UAV Cooperative Deployment 720.

The UAV Self Deployment 714 activity block represents the activity required to be performed to deploy a selected UAV and will be described with respect to FIG. 8 in specific detail. The UAV Self Retrieval 712 activity block represents the activity required to be performed to retrieve the UAV and will be described in detail in FIG. 9 in specific detail. The UAV Cooperative Retrieval 722 activity block represents the activity required for the Aircraft Actor 702 to request the Other Platform Actor 710 to retrieve the UAV as will be described with respect to FIGS. 10-12. The UAV Cooperative Deployment 720 activity block represents the activity required for the Aircraft Actor 702 to request the Other Platform Actor 708 to deploy an UAV as will be described with respect to FIG. 14.

The Networking activity block 716 represents the networking communications and data exchange between the deployed UAV Actor 704, Cooperative UAV Actor 708, Aircraft Actor 702 and Other Platform Actor 710. This networking is within the state-of-the-art and will not be described in detail herein.

The Mission 718 activity block represents the mission performed by the UAV Actor 704 and Aircraft Actor 702. Mission performance is within the state-of-the-art and will not be described in detail herein.

The actors and activities described with respect to FIG. 7 and in detail subsequently provide a method of deploying a selected UAV with capabilities to meet selected or predetermined mission requirements. A command is received to deploy a UAV having a particular capability and a UAV is selected from multiple UAVs having the particular capability to meet the mission requirements. The selected UAV is then deployed. Deploying the UAV may be accomplished by positioning a carousel containing the multiple UAVs to a position for the selected UAV. The UAV is then extended on a cradle and deployed with a grappling device as previously described To recover the UAV the system senses a UAV for retrieval and issues a command to retrieve the UAV. The first and second actuators in the grappling device are operated in response to the command to open the first and second grippers. Upon receiving a contact signal indicating contact by a hooking device on the UAV with the grippers the first and second actuators in close the first and second grippers. In certain instances when the operating aircraft, the Aircraft Actor 702, cannot recover the UAV, an alternative platform is identified and selected for retrieval of the selected UAV. The selected UAV is then handed off to the alternative platform for retrieval. Similarly, in instances where the operating aircraft does not have a UAVs meeting the necessary mission requirements, a UAV having a predetermined mission capability is located in an alternative platform, the Other Platform Actor 710. A handoff of the located UAV from the alternative platform is then accomplished. Upon completion of a UAV mission, the selected UAV is retrieved and returned to the carousel. As previously described retrieval is accomplished by operating the first and second actuators to pivot the grippers to provide grappling at a range of capture angles.

Figure 8:
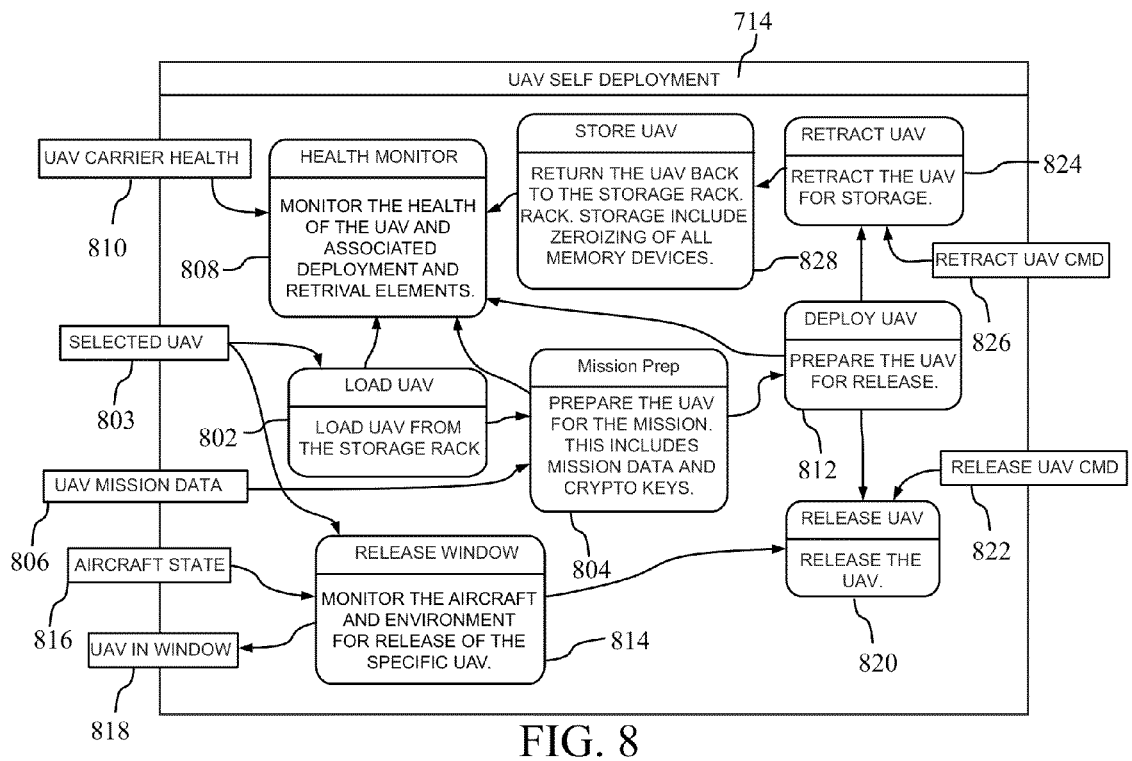
FIG. 8 is a flow chart of UAV self deployment.

The UAV Self Deployment activity 714 shown in FIG. 8 provides the generalized activities associated with a host aircraft such as rotorcraft 48*a* deploying a UAV 10 having particular capabilities to fulfill a mission requirement. In the event that the host aircraft has an internal UAV store such as magazine 50, Load UAV 802 is the process where the UAV is removed from its internal stores and loaded onto the deployment/retraction device. This activity may also include a Select UAV 803 input where the pilot or operator providing input through the user interface 66 or automated selection system within the mission controller 64 selects the appropriate UAV type and an automated selection device such as carousel control logic 62 loads the appropriate UAV onto the deployment/retrieval cradle 60. Mission Preparation 804 loads the UAV with any specific data necessary for the performance of the mission. The specifics of the data are dependent on the specific UAV. As each UAV may have unique mission data needs, the Mission Preparation activity may have some automation to detect the type of UAV and its specific data needs. The mission data is typically provided from the mission controller 64 as UAV Mission Data 806. A Health Monitoring activity 808 supervises the operational state of the UAV, the deployment device such the grappling device 26 and automated selection devices such as magazine 50. Health of the aircraft 48*a* may also be input to the Health Monitoring activity as UAV carrier Health 810. For internally stored UAVs, the Deploy UAV activity 812 deploys the UAV 10 external to the host aircraft 48*a* or 48*b*. This activity may include deploying the UAV outside of the aircraft's slip stream or the aircraft's down wash, for a rotorcraft 48*a*. In alternative embodiments for externally stored UAVs, the Deploy UAV activity 812 prepares the external mount and release system. If the UAV is containerized as in the embodiments described previously, the carousel 56 may be positioned, the container 54 may be opened and the cradle 60 extended. Release Window 814 is performed to verify the aircraft and environmental conditions are appropriate for the launch of the UAV 10. As each UAV may have unique launch constraints, the Release Window activity may have some automation to detect the type of UAV and its specific launch constraints. Inputs for the Release Window activity may include Aircraft State 816 which defines actual aircraft position, airspeed and altitude. When the parameters of the Release window activity indicate the UAV is in a window for launch, a UAV in Window 818 output may be provided. The Release UAV activity 820 physically separates the UAV 10 from the host aircraft 48*a*. This release activity is typically limited by the Release Window activity 814 to ensure the operating environment and aircraft are appropriate for UAV deployment success. A specific command from the mission controller 64, pilot or operator may be provided as an input Release UAV command 822. For internally stored UAVs, the Retract UAV activity 824 returns the UAV into the magazine 50. This activity is typically performed in the event of a problem with the UAV or in the event that deployment of the UAV is no longer required. A pilot or operator instruction or input from the mission controller 64 may be provided as Retract UAV command 826. For alternative embodiments with externally stored UAVs, the Retract UAV activity 824 safes the external mount and release system. Store UAV 828 removes any mission data from the UAV. For internally stored UAVs, this activity returns the UAV to magazine 50.

Figure 9:
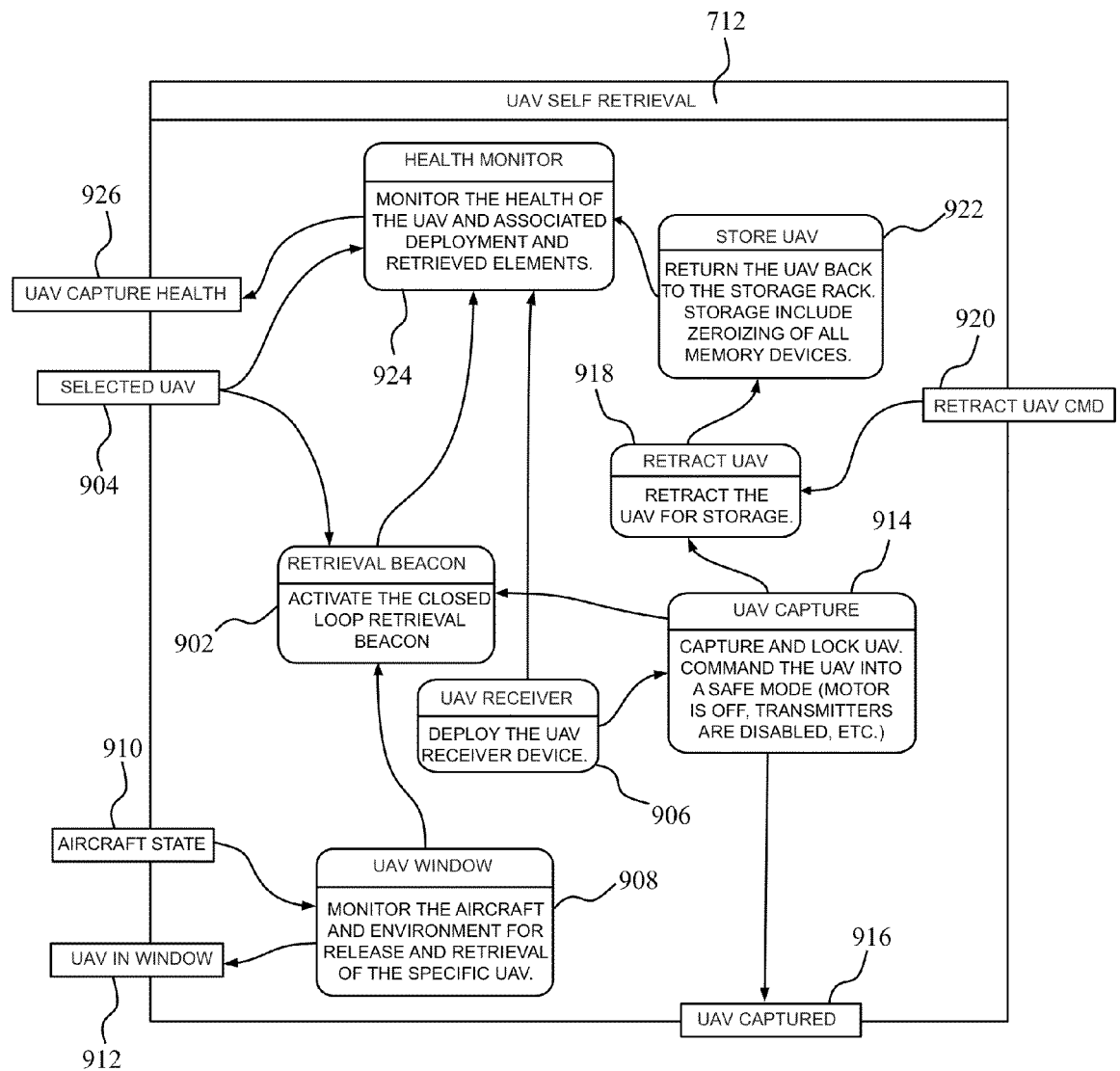
FIG. 9 is a flow chart of UAV cooperative retrieval.

The UAV Self Retrieval activity 712 described in FIG. 9 provides the generalized activities associated with the retrieval of a UAV 10 by an Aircraft Actor 702 such as rotorcraft 48*a*. The Retrieval Beacon activity 902 is representative of a device to provide the necessary queuing information between the retrieving aircraft 48*a* and the UAV 10. At a minimum, the queuing information includes the spatial information necessary for retrieval. Additional items may include closure rate, etc. The device may be either passive (e.g. optical pattern, reflective material, etc.) or active (optical, electromagnetic, radio frequency, etc.). If more than one UAV is awaiting retrieval, a Selected UAV command 904 is provided by the pilot, operator or mission controller. UAV Receiver activity 906 is representative of the grappling device 26 as shown in FIG. 2 and if stowable, the deployment of the device when required to capture the UAV 10. UAV Window activity 908 is performed to verify the aircraft and environmental conditions are appropriate as represented by the Aircraft State input 910 for the capture of the UAV. As each UAV may have unique launch constraints, the UAV Window activity may have some automation to detect the type of UAV and its specific capture constraints. A UAV in Window output 912 may be provided by the UAV in Window activity 908 for notification of the pilot, operator and/or mission controller. UAV Capture activity 914 performs the physical capture of the UAV 10 with the grappling device as described with respect to FIGS. 2A-2D. In addition to the capture of the UAV, this activity may command the UAV to a safe mode that may include turning off motor(s), transmitter(s), etc. A UAV Captured output 916 may be provided for notification of the pilot, operator or mission controller 64. For internally stored UAV, a Retract UAV activity 918 returns the UAV into the aircraft. A Retract UAV command 920 may be supplied by the pilot, operator or mission controller 64 to initiate the retraction. For externally stored UAVs, the Retract UAV activity safes the external mount and capture system. A Store UAV activity 922 removes any mission data from the UAV. For internally stored UAVs, this activity returns the UAV to its storage container 54 within the carousel 56. A Health Monitoring activity 924 supervises the operational state of the UAV, the grappling device 26 and magazine carousel 56. A UAV Capture Health message 926 may be provided to the pilot, operator or mission controller 64.

Figure 10:
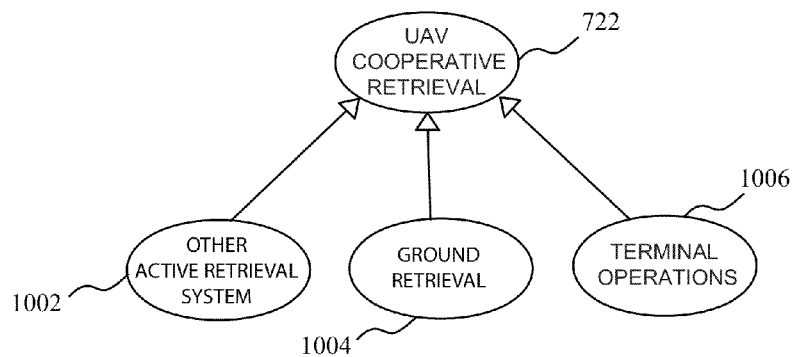
FIG. 10 is a chart depicting UAV retrieval options.

The UAV cooperative Retrieval activity 722 allows retrieval of a deployed UAV by another actor than the deploying Aircraft Actor 702. As shown in FIG. 10, Other Active Retrieval System 1002 provides a secondary aircraft or ground receiver to retrieve the UAV as will be described with respect to FIG. 11. Ground Retrieval 1004 employs existing ground resources to retrieve the UAV in the event an appropriate aircraft with UAV retrieval capability is not available as will be described with respect to FIG. 12. Terminal Operations 1006 allows destroying the UAV in the event there are no other retrieval platforms (e.g. ground or airborne) available as will be described with respect to FIG. 13.

Figure 11:
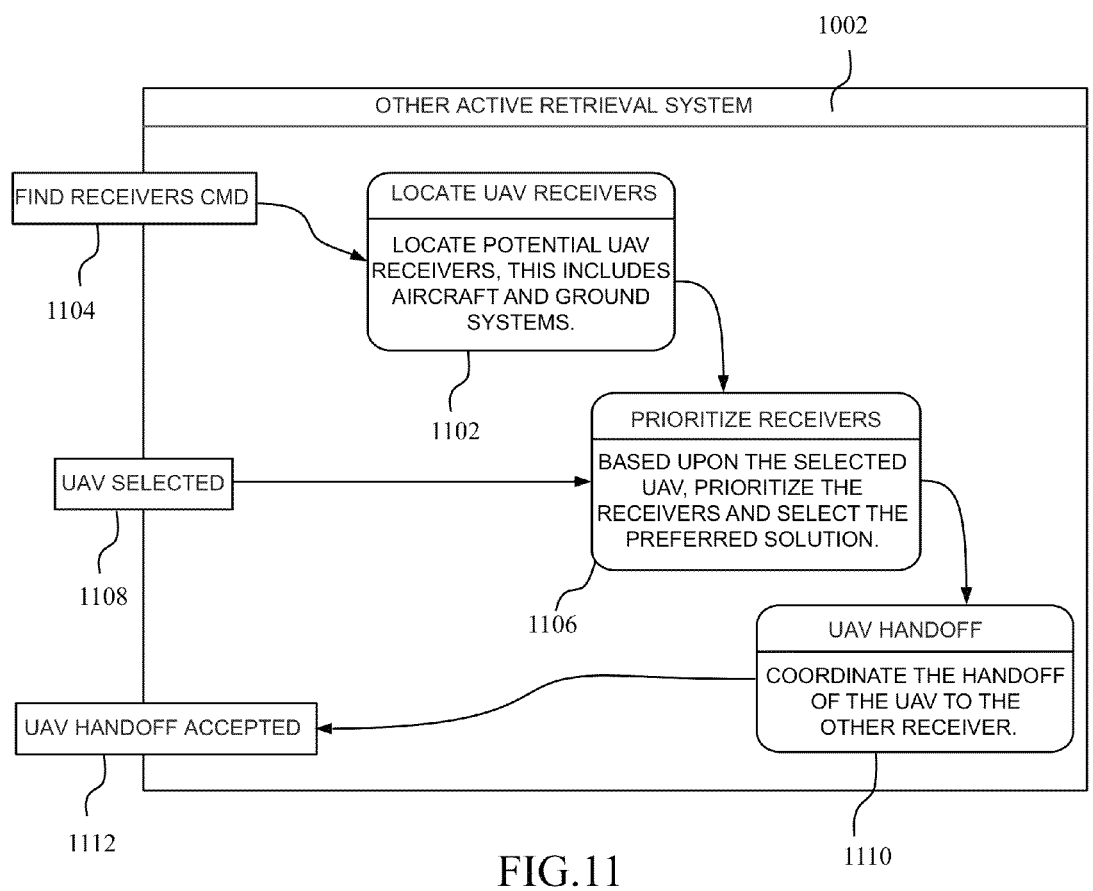
FIG. 11 is a flow chart of UAV retrieval using other active retrieval systems.

Other Active Retrieval 1002 as described in FIG. 11 provides the generalized activities associated with the retrieval of the UAV from a secondary aircraft or ground platform. A Locate UAV Receivers activity 1102 identifies potential systems that are capable of UAV retrieval. An affirmative Find Receivers command 1104 may be provided to the Locate UAV Receivers activity by the pilot, operator or mission controller 64 to initiate the activity. A Prioritize Receivers activity 1106 prioritizes the available systems capable of UAV retrieval based on a UAV Selected command 1108 which identifies the UAV to be retrieved. Typical prioritization factors may include Range to UAV, Time to UAV capture, Capability to capture the type of UAV in question, Available UAV storage capability, and Available UAV Loiter time. A UAV Handoff activity 1110 coordinates the handoff of control from the original UAV deploying aircraft (aircraft actor 702), to the retrieving system (other platform actor 710). A UAV Handoff Accepted message 1112 may be provided by the other platform actor 710 to confirm handoff.

Figure 12:
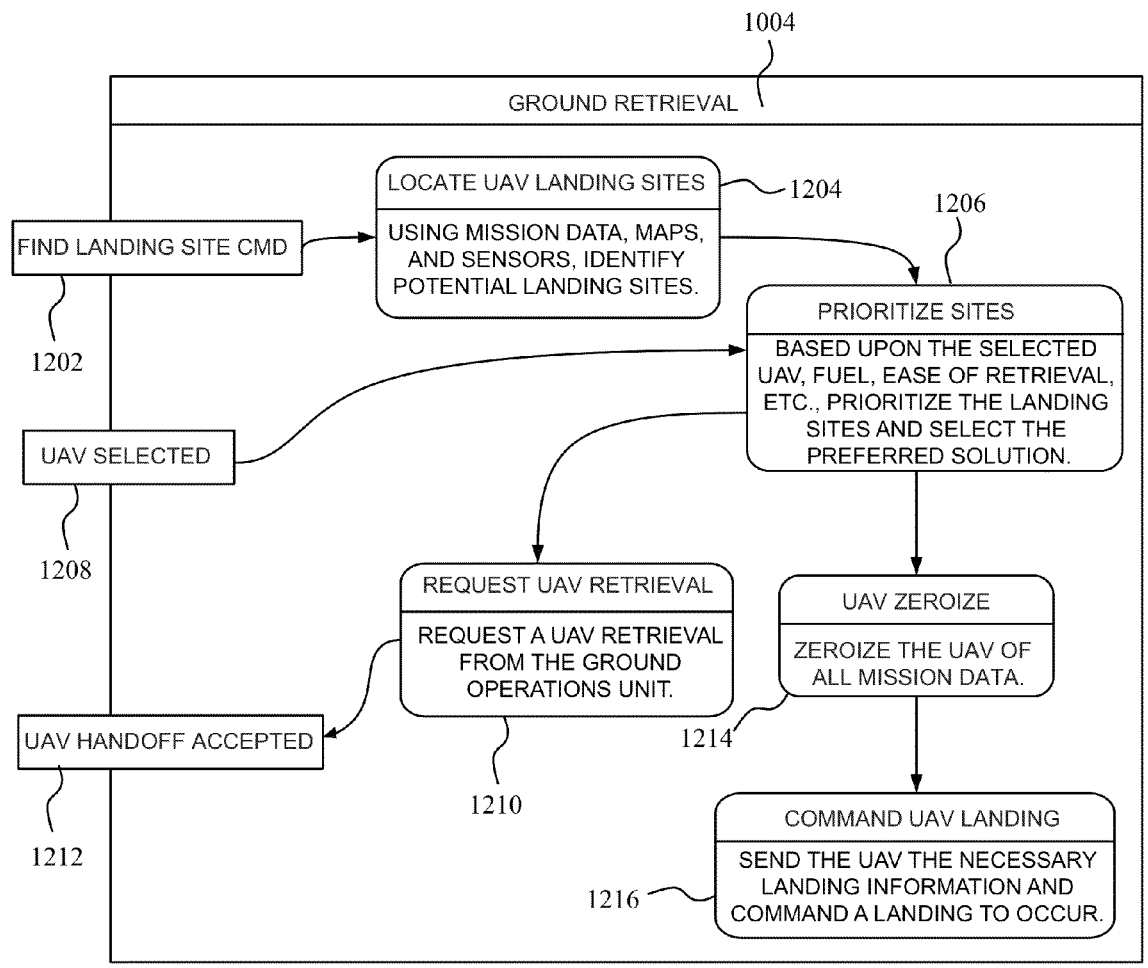
FIG. 12 is a flow chart of UAV retrieval using ground retrieval.

UAV Ground Retrieval 1004 as described in FIG. 12 provides the generalized activities associated with the retrieval of the UAV with existing ground resources acting as the Other Platforms Actor 710. When it is determined that the Aircraft Actor 702 that deployed the UAV cannot retrieve it and alternate airborne assets equipped to act as the Other Platforms Actor 710 are not available, ground retrieval is initiated by a Find Landing Site command 1202 to a Locate UAV Landing Sites activity 1204 that uses aircraft and UAV sensors, maps and mission data to locate potential landing/retrieval zones. A Prioritize Sites activity 1206 prioritizes the available landing zones based on a UAV selected input 1208 identifying the UAV to be retrieved. Typical prioritization factors may include range to UAV, safety and security of the landing zone, available ground resources to retrieve the landed UAV, capability to retrieve the type of UAV in question, available storage capability, and available UAV Loiter time. A Request UAV Retrieval activity 1210 may be either a manual or autonomous process to coordinate the retrieval of the UAV. A UAV Handoff Accepted message 1212 may be provided by the activity. A UAV Zeroize activity 1214 removes any mission or sensitive data (e.g. codes, software, frequencies, keys, etc.) from the UAV to limit the unintentional dissemination of data. A Command UAV Landing activity 1216 performs a coordinated landing of the UAV at the identified landing zone.

Figure 13:
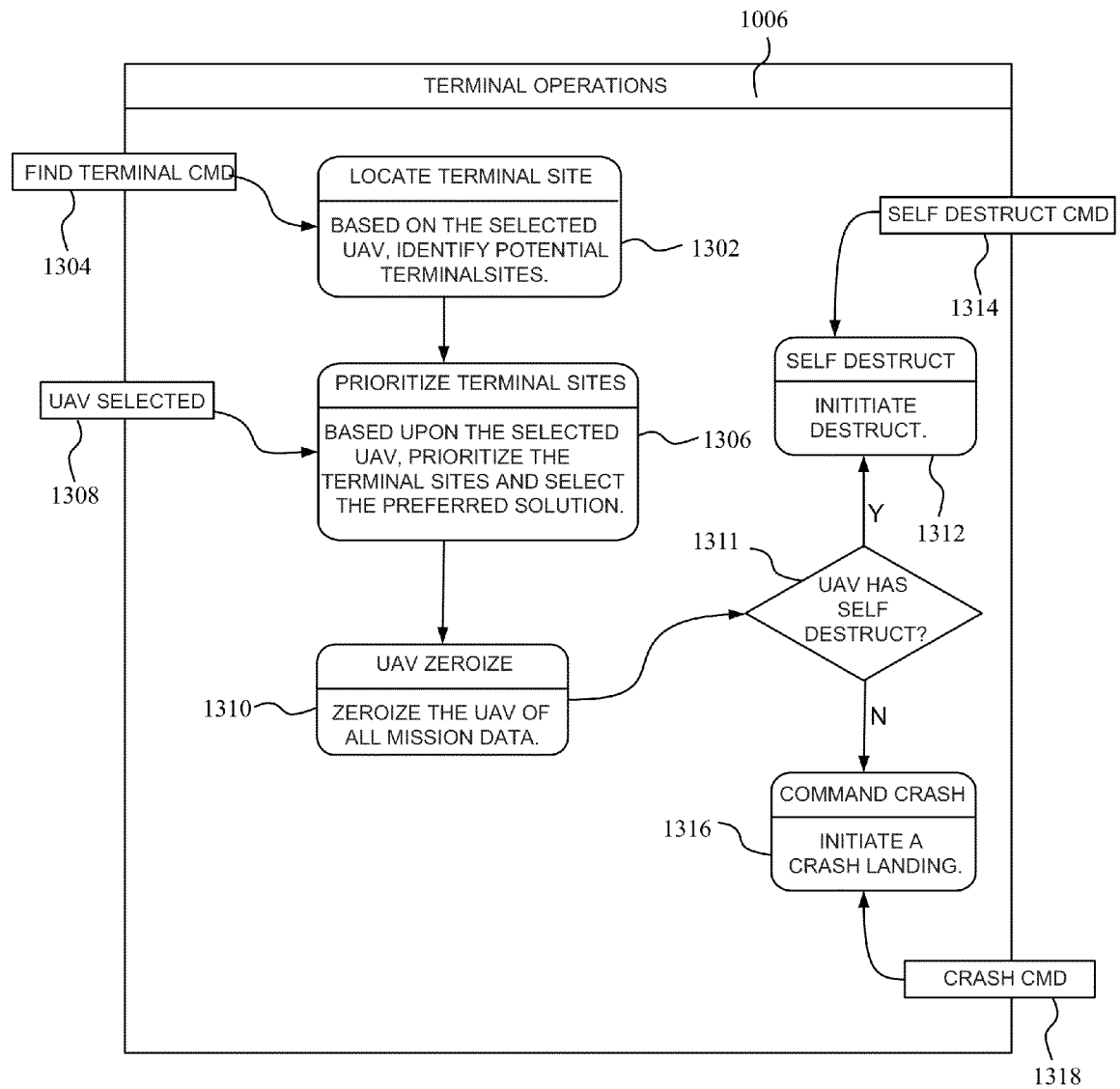
FIG. 13 is a flow chart of UAV terminal operations.

If no alternative retrieval solution exists destruction of the UAV may be required. The UAV Terminal Operations 1006 described in FIG. 13 provides the generalized activities associated with the destruction of the UAV in the event there are no available retrieval opportunities. A Locate Terminal Site activity 1302 responsive to a Find Terminal command 1304 issued by the pilot, operator or mission controller 64 uses aircraft and UAV sensors, maps, mission data to locate potential areas for UAV self destruction. A Prioritize Terminal Sites activity 1306 prioritizes the available UAV self destruction based on the type of UAV identified in UAV Selected input 1308. Typical prioritization factors may include range to UAV, safety and security of the self destruction area, and ability to support self destruction (e.g. hard surfaces, no burn zones, etc.). A UAV Zeroize activity 1310 removes any mission or sensitive data (e.g. codes, software, frequencies, keys, etc.) from the UAV. A UAV Type decision 1311 determines whether the particular UAV has a self-destruct feature. In the event the UAV has an internal self-destruction feature, the Self Destruct activity 1312 coordinates the release of necessary safety interlocks and commands the destruction of the UAV over the prioritized terminal site responsive to a Self Destruct command 1314 issued by the pilot, operator or mission controller 64. In the event the UAV does not have an internal self-destruction feature, the Command Crash activity 1316 controls the UAV to perform a high speed crash into the prioritized terminal site responsive to a Crash command 1318.

Figure 14:
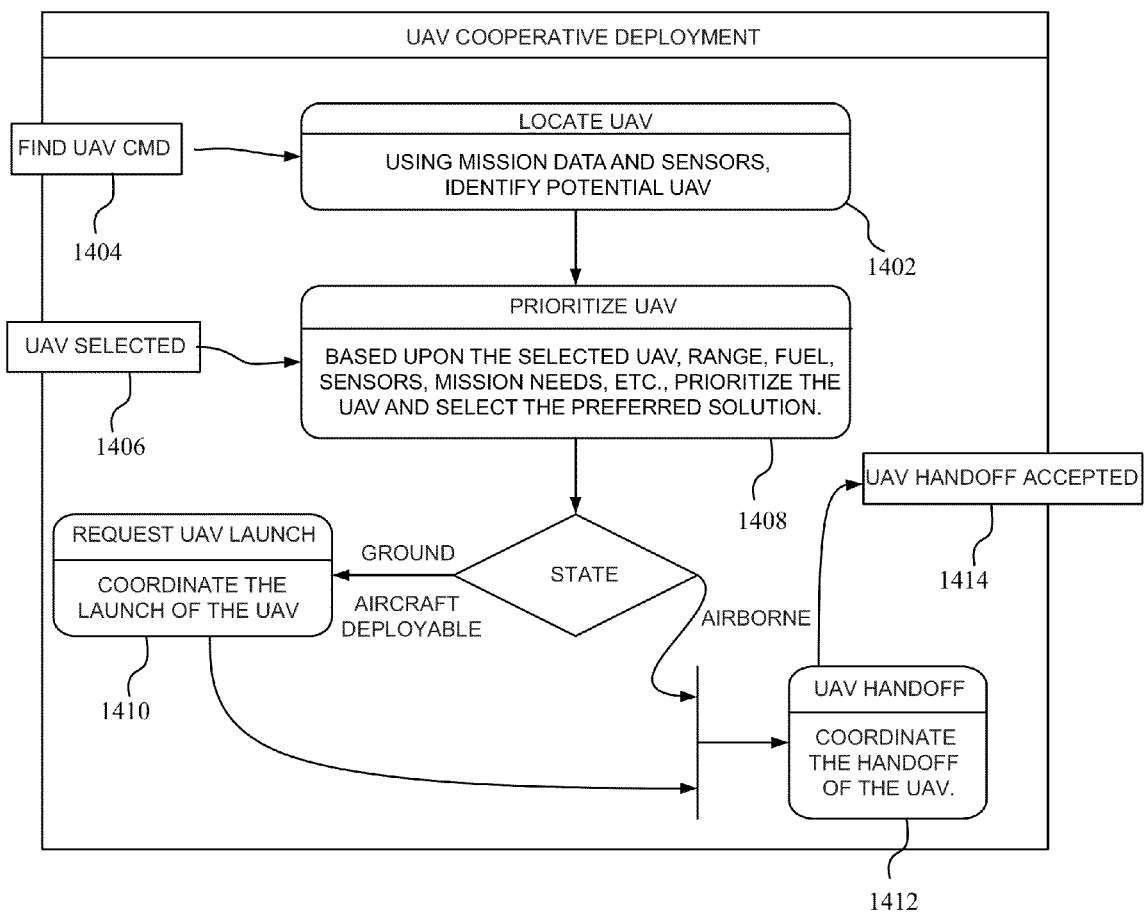
FIG. 14 is a flow chart of UAV Cooperative Deployment.

UAV Cooperative Deployment 720 described in detail in FIG. 14 provides the generalized activities associated with the deployment and reallocation of airborne and ground based UAV having a predetermined capability to the primary Aircraft Actor 702 to meet a specific mission requirement. A Locate UAV activity 1402 responsive to a Find UAV command 1404 from the pilot, operator or mission controller 64 uses aircraft sensors, maps, mission data to locate potential UAV for cooperative deployment. Responsive to a UAV selected input 1406, a Prioritize UAV activity 1408 prioritize the available UAVs. Typical prioritization factors may include UAV types, UAV Sensors or other installed equipment, range to UAV, available fuel, and mission priorities. In the event the UAV is on the ground or stored on a secondary aircraft (Other Platform actor 710) and is available for launch, the Request UAV Launch activity 1410 coordinates the deployment of the selected UAV from a ground facility or UAV Handoff activity 1412 coordinates the handoff of control of the deployed UAV to the primary aircraft.

Figure 15:
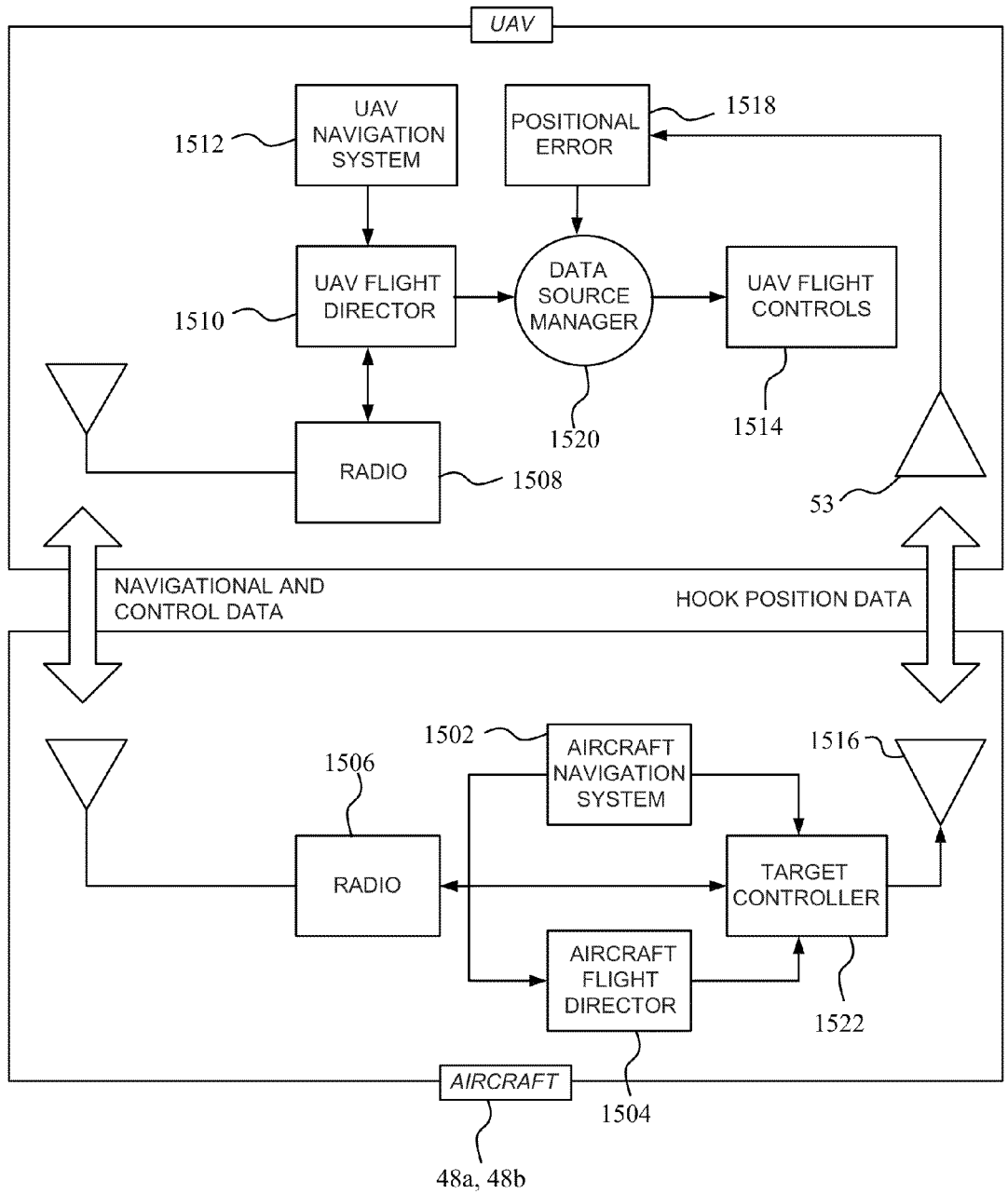
FIG. 15 is a block diagram of UAV and managing aircraft communication and control.

For the Self Retrieval activity 712 and Cooperative Retrieval activity 722 a UAV control approach described in FIG. 15 is employed. The generalized approach for the coordinated grappling of the UAV by the aircraft (either the Aircraft Actor 702 in the UAV Self Retrieval activity 712 or the airborne Other Platforms Actor 710 in the Cooperative Retrieval activity 722) is a coordinated effort between the UAV and the aircraft and is segmented into two primary phases.

The first phase is associated with coordinating the flight plan of the aircraft with that of the UAV. This coordination occurs with the aircraft 48*a*, 48*b* providing the UAV 10 its present flight position from the aircraft's navigation system 1502, and flight path from the Aircraft's Flight Director 1504. The coordination of information would typically occur using state of the art radios 1506 and 1508 on the aircraft and UAV. With this information and the inherent flight dynamics of the UAV, the UAV flight director 1510 develops a best path to the aircraft using the UAV navigation system 1512 and commands the UAV's flight controls 1514 as necessary. During this phase, the coordination of information may also include mission specific data or data necessary to support the retrieval and storage of the UAV. The UAV initiates the second or retrieval phase when the UAV is within the range of a hook position sensor 53 which may be mounted on the aircraft or UAV as previously described. If an active hook position target 1516 is used, mounted on either the aircraft of UAV opposite from the hook position sensor, the aircraft may activate it when it senses the UAV is in range or when commanded by the UAV. During this phase, the UAV Hook Position Sensor measures the relative position, rotation and if necessary, range to the Hook Position Target. This data is used to compute a relative position error and is fused with the UAV Flight Director 1510 by the Data Source Manager 1520 to provide fine navigation control enabling the UAV to fly into position where the UAV hooking device as described with respect to FIGS. 1A and 1B can be captured by the grappling device described with respect to FIGS. 2A-2D. The Hook Position Sensor can be passive (e.g. camera sensor) or active (e.g, radar, lidar, microwave, etc.) depending on the specific operational and performance needs.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An aircraft system comprising:
a first aircraft having
a grappling device including
a first gripper operatively attached to a first actuator;
a second gripper operatively attached to a second actuator independent from the first actuator, the first gripper and the second gripper being operatively attached and configured to jointly move about a common pivot between an open and a closed position by the first and second actuators to engage a hooking device, the first gripper and the second gripper being additionally configured to pivot together with asymmetric extension of the first and second actuators to change a capture angle; and
a first controller configured to receive a command, operating the first and second actuators in response lo the command to selectively open and close the first and second grippers of the grappling device, the controller being configured to receive a second command, to operate the first and second actuators with asymmetric extension to pivot the grippers about the pivot point and provide grappling at a range of capture angles.

2. The aircraft system of claim 1, wherein the first aircraft is one of a fixed wing aircraft and a rotorcraft.

3. The system of claim 1, wherein first and second grippers are asymmetric to each other.

4. The system of claim 1, wherein the first gripper incorporates a surface with a non-binding profile enhancing release of the hooking device, and the second gripper provides a surface with a closed profile enhancing capture of the hooking device.

5. The system of claim 1, further comprising a first sensor integrated into the grappling device and configured to provide a signal to the controller when the grappling device is in contact with the hooking device, the controller issuing the command to operate the grappling device first and second actuators to close the first and second grippers responsive to the signal.

6. The aircraft system of claim 1, further comprising:
a second aircraft having a surface on which the hooking device mounted, said hooking device including a ring rotatable from the surface and a third actuator operatively attached to the ring and configured to rotate the ring between a stowed and an extended position.

7. The aircraft system of claim 6, wherein the second aircraft is an unmanned aerial vehicle (UAV).

8. The aircraft system of claim 6 further comprising a second controller configured to receive a command and operate the third actuator.

9. The aircraft system of claim 8 wherein the third actuator is rotatable to a post capture operating position.

10. The aircraft system of claim 6 further comprising a sensor attached to the hooking device and configured to provide a hooking sensor signal.

11. An Unmanned Aerial Vehicle (UAV) deployment and retrieval system comprising:
an aircraft having
a grappling device, and
a carousel adapted to receive and store a plurality of UAVs and positionable for deployment of a selected UAV,
each UAV in said plurality of UAVs having
a hooking device adapted for engagement by the grappling device;
a mission controller receiving a mission requirement and selecting a respective one of said plurality of UAVs;
a carousel controller responsive to the mission controller for aligning the respective one UAV for deployment; and,
a grappling device controller responsive to the mission controller for retrieving a UAV with the grappling device said grappling device having
a first gripper operatively attached to a first actuator;
a second gripper operatively attached to a second actuator independent from the first actuator, the first gripper and the second gripper being operatively attached and configured to move about a common pivot point between an open and a closed position, the first gripper and the second gripper being configured to pivot together to change a capture angle; and further wherein the grappling device controller is configured to receive a command from the mission controller, operating the first and second actuators in response to the command to selectively open and close the first and second grippers of the grappling device, the controller being configured to receive a second command, to operate the first and second actuators with asymmetric extension to pivot the grippers about the pivot point and provide grappling at a range of capture angles.

12. The system of claim 11 wherein the hooking device comprises:
   a ring rotatable from a fuselage of the UAV; and
   a third actuator operatively attached to the ring and configured to rotate the ring between a stowed and an extended position.

13. The system of claim 11 wherein the aircraft is one of a rotorcraft and a fixed wing aircraft.

* * * * *